Patented July 29, 1924.

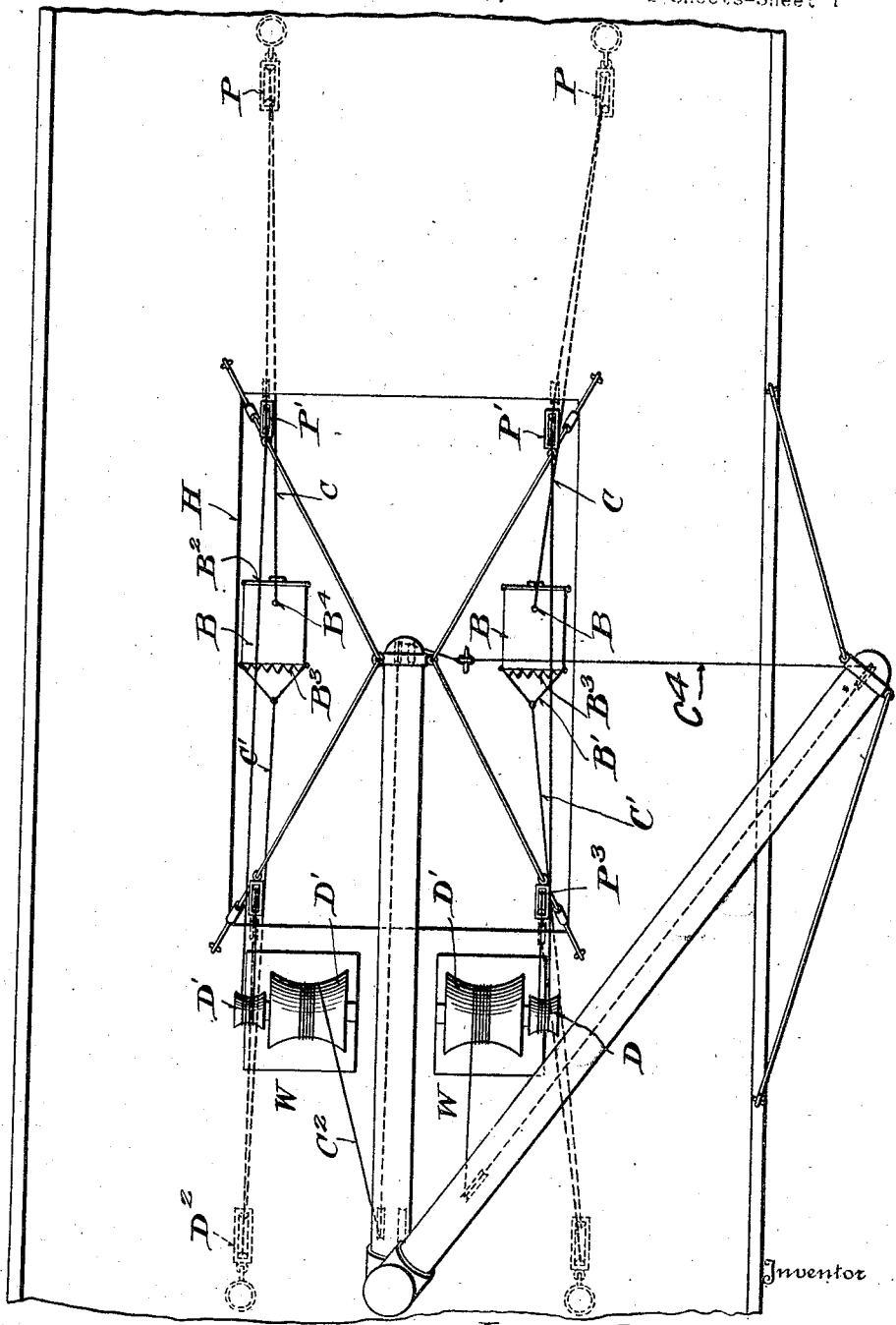

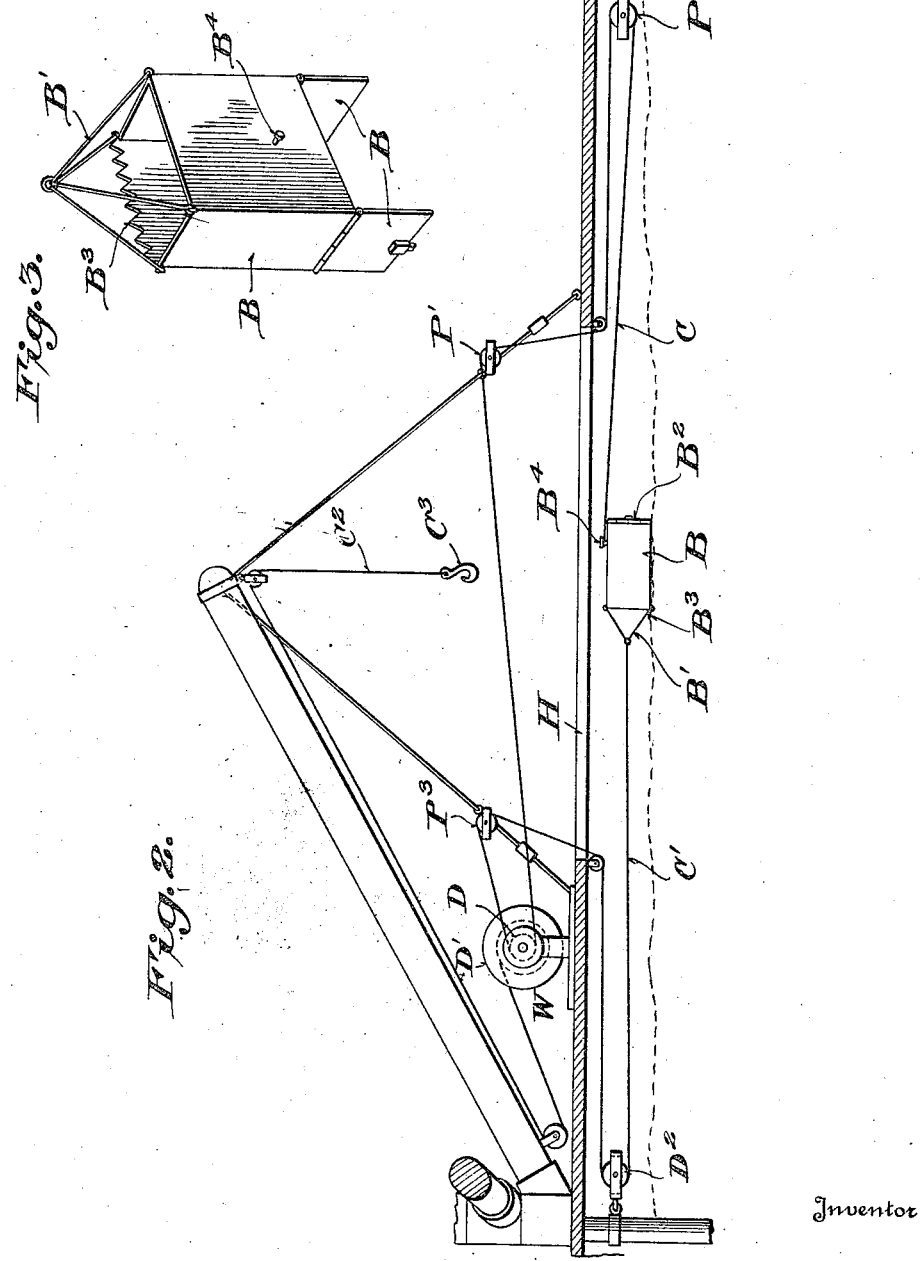

1,503,019

UNITED STATES PATENT OFFICE.

JOHN BOMBARDI, OF ROSEBANK, NEW YORK.

UNLOADING APPARATUS.

Application filed September 19, 1922. Serial No. 589,211.

*To all whom it may concern:*

Be it known that I, JOHN BOMBARDI, a citizen of the United States, residing at Rosebank, Staten Island, State of New York, have invented certain new and useful Improvements in Unloading Apparatus, of which the following is a specification.

This invention relates to an improvement in unloading apparatus for ships and the like.

A primary object of the invention is to expedite the unloading of bulk cargo from the hold of a vessel and at the same time dispensing with much of the manual labor usually required for removing the cargo from inaccessible portions of the hold to a position where it may be readily taken out through the hatchway. That is to say, the invention contemplates a novel arrangement whereby the buckets or other unloading receptacles may be quickly filled with the cargo material by horizontally dragging the bucket over the cargo from remote portions of the hold so that, when the filled bucket reaches the position of the hatchway, it may be readily lifted out to discharge and deliver its load.

With the above and other objects in view which will more readily appear as the nature of the invention is better understood, the same consists in the novel construction, combination and arrangement of parts, hereinafter more fully described, illustrated and claimed.

A preferred and practical embodiment of the invention is shown in the accompanying drawings in which:—

Figure 1 is a plan view of the portion of the vessel surrounding the hatchway.

Figure 2 is a vertical longitudinal sectional view of the construction shown in Figure 1.

Figure 3 is a detail perspective view of one of the unloading buckets.

Similar reference characters designate corresponding parts throughout the several figures of the drawings.

One of the distinctive features of the present invention is to utilize the same bucket for scraping or trimming the cargo from the remote portions of the hold that is lifted out for unloading purposes.

While the general practice heretofore has been to use hoisting buckets for removing coal or other bulk cargo from the hold of a vessel through the hatchway, nevertheless considerable manual labor is required to remove the cargo from the remote portions of the hold to the hatchway position, where the hoisting bucket may pick it up. As the cost of such manual labor is an important factor in large unloading operations, and also sacrifices speed, it is desirable to eliminate the same, and to that end the present invention distinguishes from the prior practice by utilizing one and the same bucket for removing the cargo from remote portions of the hold, and hoisting it out, the filling or loading being effected automatically by dragging the bucket over the cargo to pick up its load.

Therefore, according to the present invention, it is proposed to utilize a bucket or receptacle B which is caused to automatically pick up its load in its travel from a remote portion of the hold to a position beneath the hatchway, and then, when the said receptacle reaches such position, the means employed for drawing and dragging the same in a relatively horizontal plane over the cargo may be disconnected and the hoisting means attached thereto for lifting and delivering the contents of the bucket as desired.

By reference to Figure 2 of the drawings, it will be observed that the bucket B is provided with a suitable lifting bail B' at the front end thereof and a dumping bottom $B^2$ consisting of suitable doors which may be opened to discharge the contents of the receptacle when desired. One side of the bucket B, preferably the side opposite that having the teeth $B^3$, is provided with a cable anchoring post or eye $B^4$ which is adapted to receive one end of a draw cable C that is adapted to pass over a suitably anchored pulley P within the hold of the vessel and then pass over another pulley P' outside of the hold, on its way to the small drum D of the winch W.

As will be observed from Figures 1 and 2, the said winch W may be located adjacent the hatchway H of the vessel and is of a standard reversible type, whereby, when the draw cable C has been disconnected after drawing the bucket B to a remote portion of the hold, a drag cable C' may be manually connected to the drum D to thereby drag the bucket B over the cargo to fill the same, by reason of the fact that the said cable C' is connected to the lifting bail B' of the bucket.

The drag cable C', like the draw cable C, also passes over suitably anchored pulleys D² and P³ within and without the hold so that the cable may be conveniently guided into and out of the hatchway to drag the bucket B horizontally over the cargo. When the drag cable C' is in operation the bucket B travels from the remote portion of the hold to which it was drawn by the draw cable C to a position beneath the hatchway H, thereby becoming filled as it travels over the cargo.

When the filled bucket B reaches the position shown in Figure 2, the draw cable C and drag cable C' may be disconnected and the hoisting cable C² may be connected with the bale B' by means of a hook or its equivalent C³. The hoisting cable C², one end of which is connected with the main drum D' of the winch W, may be then put in operation to hoist or lift the loaded bucket B from its position beneath the hatchway to its unloading position. Therefore, it will be apparent that the same bucket B, which is drawn backwardly over the cargo and then dragged forwardly to become loaded or filled, may be hoisted out of the hold to discharge its load. The cable C² has a cable C⁴ connected therewith for drawing the bucket to one side to be discharged over the side of the vessel.

The pulleys P and D² which are located within the hold may be anchored to any convenient point within the hold of the vessel, such for instance as a post which supports the deck or other part of the ship's frame-work, according to the portion of the cargo which still remains to be unloaded. As the bucket removes the cargo from the zone of the hold adjacent the anchoring point of one of the pulleys P or D², the said pulley may be removed to another zone and the operation of unloading may continue automatically by simply alternately drawing and dragging the bucket over the cargo in a relatively horizontal plane, and then lifting it out vertically by the hoisting mechanism when the bucket reaches the position of the hatchway.

As will be observed from Figure 1 of the drawings, the equipment may be duplicated to utilize more than one bucket so that, as one bucket is being hoisted and unloaded, another bucket may be manipulated within the hold to become loaded and hoisted out for delivery and discharge. Although two winches and two sets of fall and tackle are illustrated in Figure 1, it will of course be understood that this number may be increased if the size of the hatchway permits, thereby materially expediting the unloading operation.

From the foregoing it will be apparent that, as previously indicated, one of the novel and distinctive features of the present invention resides in the provision of means for alternately drawing and dragging the bucket B over the cargo to remove the cargo from remote portions of the hold to an accessible point for the hoisting mechanism, the same bucket being utilized for removing the cargo from the wings of the vessel that is used for hoisting the cargo out to the point of delivery.

Without further description it is thought that the features and advantages of the invention will be readily apparent to those skilled in the art, and it will of course be understood that changes in the form, proportion and minor details of construction may be resorted to without departing from the spirit of the invention or scope of the appended claim.

I claim:

An unloading apparatus for vessels including in combination with the hold having a hatchway, an unloading receptacle having a bail at one end and a door constituting a dumping bottom at the other end, a cable anchoring member on one side of the receptacle, a draw cable attached to the bail, fixed pulleys located in remote portions of the hold and having the draw and drag cable passing thereover, a reversible winch adjacent the hatchway adapted to be alternately connected with the draw and drag cables, and a hoisting cable positioned above the hatchway and adapted to be attached to the bail of the receptacle when the draw and drag cables have been detached therefrom to lift the receptacle out of the hold.

In testimony whereof I hereunto affix my signature.

JOHN BOMBARDI.